United States Patent
Palmer

(10) Patent No.: US 6,285,481 B1
(45) Date of Patent: Sep. 4, 2001

(54) FREE-SPACE LASER COMMUNICATIONS ERROR CONTROL SYSTEM

(75) Inventor: Douglas Palmer, San Diego, CA (US)

(73) Assignee: Trex Communications Corporation, San Diego, CA (US)

( * ) Notice: Subject to any disclaimer, the term of this patent is extended or adjusted under 35 U.S.C. 154(b) by 0 days.

(21) Appl. No.: 08/924,393

(22) Filed: Sep. 5, 1997

(51) Int. Cl.$^7$ .................................................. H04B 10/10
(52) U.S. Cl. .................... 359/159; 359/110; 359/153; 359/161; 359/172
(58) Field of Search ................... 359/110, 112, 359/152, 153, 154, 159, 161, 194, 172

(56) References Cited

U.S. PATENT DOCUMENTS

| | | | |
|---|---|---|---|
| 5,129,095 | * 7/1992 | Davis et al. | 455/12.1 |
| 5,220,678 | * 6/1993 | Feei | 455/69 |
| 5,305,468 | * 4/1994 | Bruckert et al. | 455/69 |
| 5,355,242 | * 10/1994 | Eastmond | 359/189 |
| 5,450,616 | * 9/1995 | Rom | 455/69 |
| 5,517,608 | * 5/1996 | Suzuki et al. | 359/161 |
| 5,532,858 | * 7/1996 | Hirohashi et al. | 359/159 |
| 5,566,022 | * 10/1996 | Segev | 359/172 |
| 5,828,947 | * 10/1998 | Michel et al. | 455/69 |

* cited by examiner

Primary Examiner—Leslie Pascal
(74) Attorney, Agent, or Firm—Fish & Richardson P.C.

(57) ABSTRACT

A free-space atmospheric laser communications error control circuit. The invention includes a control circuit that circumvents the problems of scintillation and other atmospheric degradation of signal propagation in a free-space atmospheric laser communication system by transmitting a "signal strength" data stream between each pair of communicating laser transceivers. The signal strength data stream indicates the signal strength of the sending transceiver as actually received by the remote receiving transceiver. If the sending transceiver receives data from the remote receiving transceiver indicating that the signal strength of the sending transceiver has fallen to or below a selected threshold, or if the sending transceiver cannot detect the signal strength data stream, then the sending transceiver suspends transmission of information packets. The sending transceiver resumes transmission of information packets when the indicated signal strength level returns to an acceptable level. The laser communication system attempts to transmit the signal strength data stream between the transceivers even though information packets are not transmitted.

28 Claims, 3 Drawing Sheets

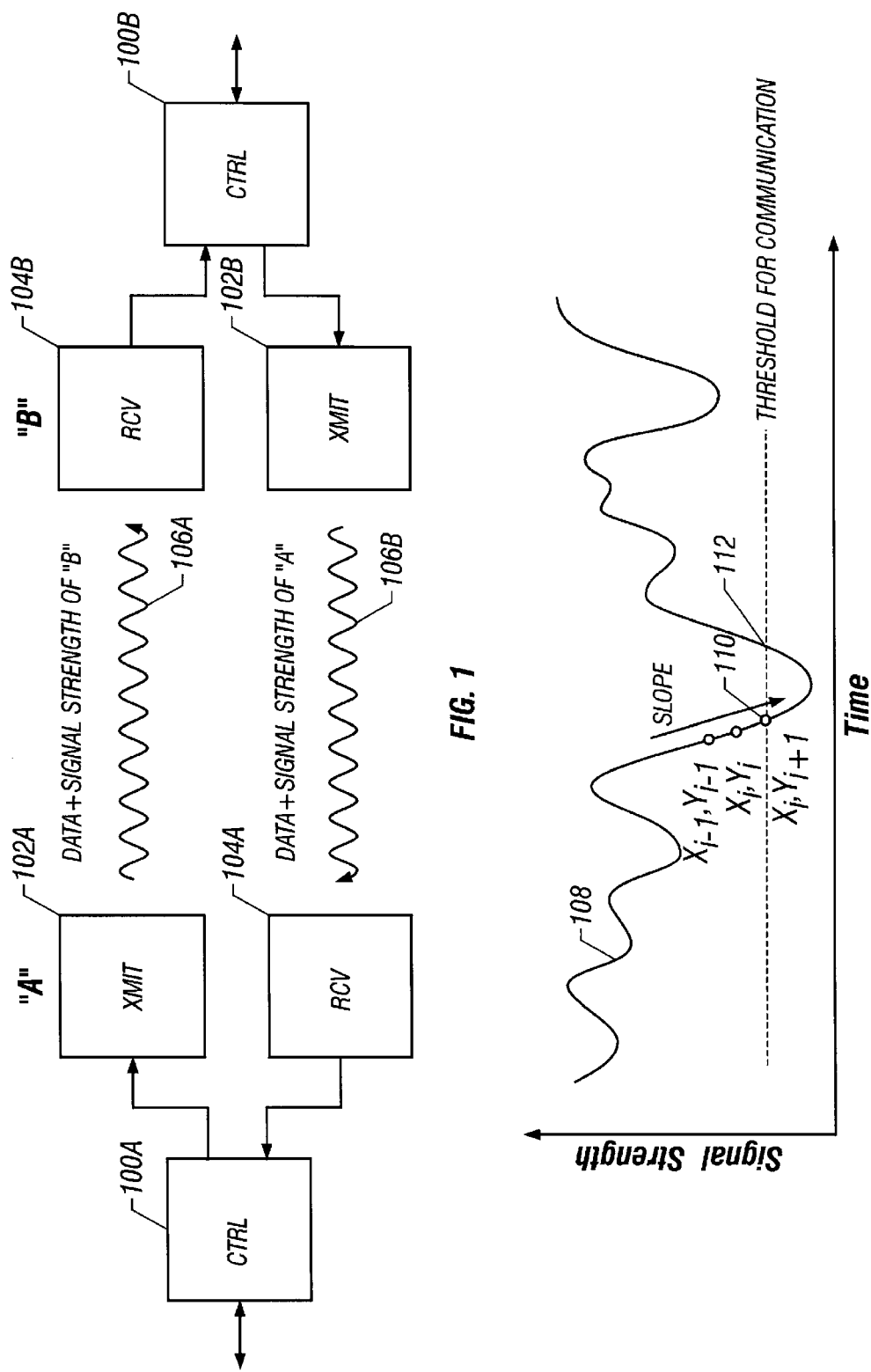

FREE-SPACE LASER COMMUNICATIONS ERROR CONTROL SYSTEM

BACKGROUND

1. Technical Field

This invention relates to free-space laser communication systems, and more particularly to a free-space atmospheric laser communications error control circuit.

2. Background Information

Free-space atmospheric laser communication systems transmit and receive information by means of a light beam that propagates through the atmosphere. When used for air-to-air or air-to-ground communications, such systems pose a number of challenging problems.

One such problem is that over long distances, or over short distances through a turbulent atmosphere, the beam is absorbed, diffracted and refracted, causing such problems as scintillation in the receiver. What the receiver sees is a "twinkling", like light from a star. The beam can actually disappear and reappear in a millisecond. The disappearance of the beam is called a "dropout". Such dropouts can disrupt normal communications 20–30 times a second if not controlled. Dropouts can last from one to ten milliseconds. Another form of disruption is attenuation of the beam due to absorption in haze, mist, fog, snow or other weather phenomenon. During such conditions, it is not uncommon to have the signal go from full-amplitude to nothing every few seconds.

The effect on communications of this "channel property" takes two forms: data can be lost and/or data can be corrupted. This is a problem for interfacing a free-space atmospheric laser communication system with modern network systems, which are designed to operate with a fast, reliable, low-error transport media (the physical layer). Accordingly, it is important to try to minimize or eliminate dropouts and to attain very low bit-error-rates. The present invention addresses the problem.

SUMMARY

The invention includes a control circuit that circumvents the problems of scintillation and other atmosphere-induced degradation of signal propagation in a free-space atmospheric laser communication system by transmitting a "signal strength" data stream between each pair of communicating laser transceivers. The signal strength data stream indicates the signal strength of the sending transceiver as actually received by the remote receiving transceiver. If the sending transceiver receives data from the remote receiving transceiver indicating that the signal strength of the sending transceiver has fallen to or below a selected threshold, or if the sending transceiver cannot detect the signal strength data stream, then the sending transceiver suspends transmission of information packets. The sending transceiver resumes transmission of information packets when the indicated signal strength level returns to an acceptable level. This technique prevents transmitting errors during periods of dropouts or low signal level due to scintillation or other causes. However, at all times, the laser communication system attempts to transmit the signal strength data stream between the transceivers even though information packets are not transmitted.

In another embodiment of the invention, the signal strength data stream is used to regulate gain of the transmitter for each transceiver while the signal strength of such transceiver exceeds the selected threshold.

In another embodiment of the invention, the signal strength data stream is monitored by each transceiver and used to predict when the signal strength being received by a remote receiving transceiver will fall below the selected threshold. This embodiment has the advantage that transmission can be suspended before data dropouts can occur, obviating the need to retransmit lost data.

An advantage of the invention is that it reduces errors by not transmitting data during periods of poor signal transmission, which result in a low signal to noise ratio (SNR); bit error rate is partly determined by the SNR of a channel. Another advantage of the preferred embodiment of the invention is that each transceiver can perform gain control for rapidly gyrating transmission amplitudes by using feedback from a remote transceiver.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a block diagram showing a pair of free-space atmospheric laser communication transceivers.

FIG. 2 is a diagram showing variation in the plotted signal strength of a transmitted laser beam.

Like reference numbers and designations in the various drawings indicate like elements.

DETAILED DESCRIPTION

Figure 3:
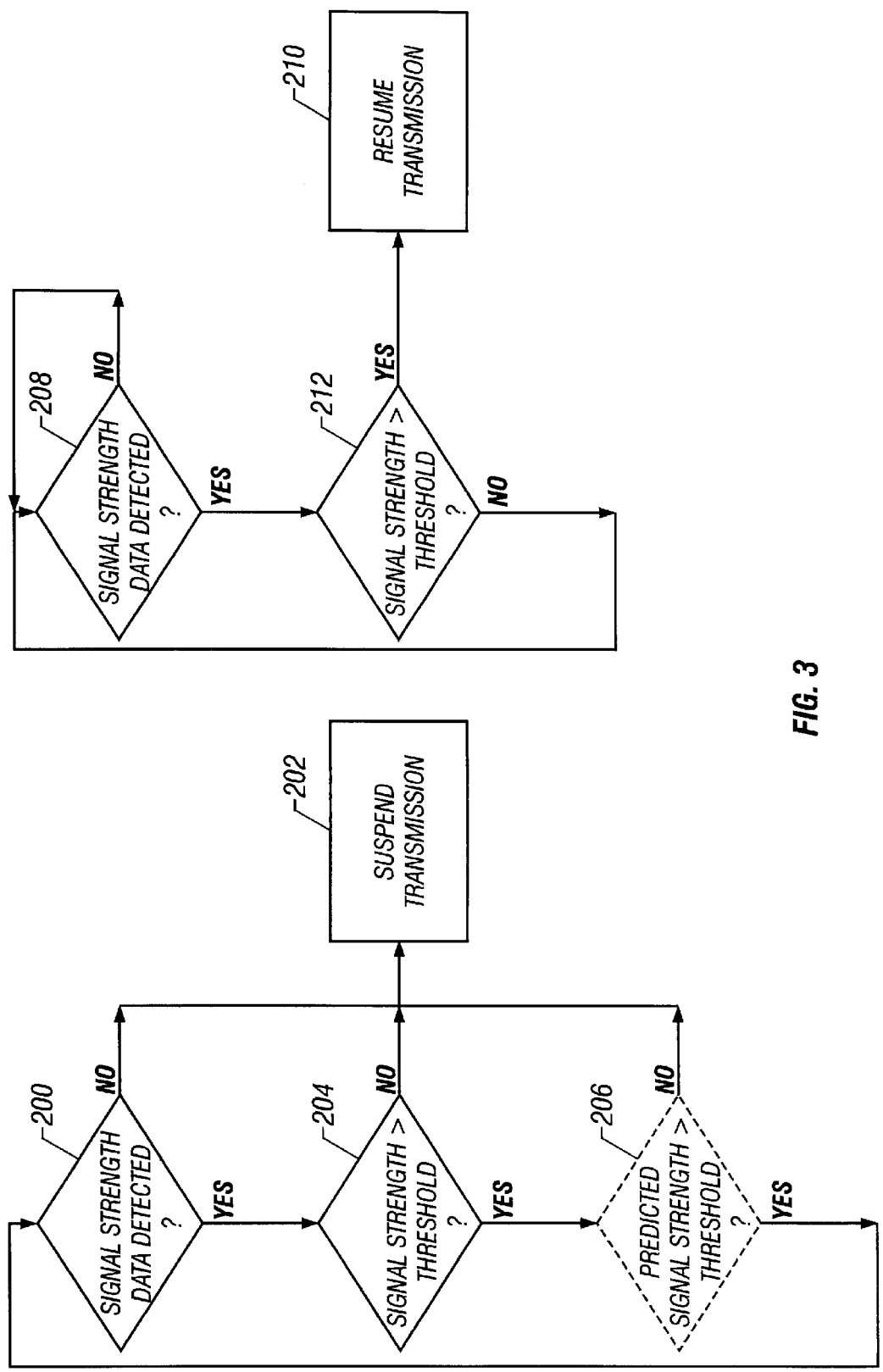
FIG. 3 is a flowchart showing one algorithm for implementing the invention.

FIG. 1 is a block diagram showing a pair of free-space atmospheric laser communication transceivers. An "A" transceiver includes a control system 100A, a transmitter 102A, and a receiver 104A. A "B" transceiver includes a control system 100B, a transmitter 102B, and a receiver 104B. The implementation of the respective control systems 100A, 100B, transmitters 102A, 102B, and receivers 104A, 104B is conventional, except that each control system 100A, 100B has been modified in accordance with the present invention.

In particular, each control system 100A, 100B includes a control circuit that circumvents the problem of scintillation and other transmission problems in a free-space atmospheric laser communication system by transmitting a "signal strength" data stream between each pair of communicating laser transceivers. The signal strength data stream indicates the signal strength of the sending transceiver as actually received by the remote receiving transceiver. If the sending transceiver receives data from the remote receiving transceiver indicating that the signal strength of the sending transceiver has fallen to or below a selected threshold, or if the sending transceiver cannot detect the signal strength data stream, then the sending transceiver suspends transmission of information packets. The sending transceiver resumes transmission of information packets when the indicated signal strength level returns to an acceptable level. This technique prevents transmitting errors during periods of dropouts or low signal level due to scintillation or other causes. However, at all times, the laser communication system attempts to transmit the signal strength data stream between the transceivers even though information packets are not transmitted.

For example, referring to FIG. 1, transceiver A sends a data stream 106A to transceiver B. Under normal conditions, the data stream 106A would include conventional information packets plus specially flagged data packets indicating the signal strength of transceiver B as received by transceiver A. Similarly, transceiver B sends a data stream 106B to transceiver A. Under normal conditions, the data stream 106B would include conventional information packets plus specially flagged data packets indicating the signal strength of transceiver A as received by transceiver B. In this way, each transceiver can monitor the strength of its own transmissions as actually received by the remote transceiver. Thus, each transceiver can determine and respond to the effects of atmospheric turbulence, aberrations, or other factors that may disturb a transmission beam. An advantage of this aspect of the invention is that it reduces errors by not transmitting data (other than the signal strength data streams in both directions) during periods of poor signal transmission.

When using a free-space atmospheric laser communication system in accordance with the invention in conjunction with a conventional local area network or wide area network, dropouts are perceived by the network as simply contributing slightly to "congestion". In severe weather conditions, this congestion could reduce network throughput by as much as ten percent. However, since a typical free-space atmospheric laser communication system is not bandwidth limited, the control scheme of the present invention contributes little overall adverse effect.

In another embodiment of the invention, the signal strength data stream is used to regulate gain of the transmitter 102A, 102B for each transceiver A, B while the signal strength of such transceiver exceeds the selected threshold. Such a gain control allows the system to compensate for slow variations in signal strength due to fog, rain, etc., and allows the system to adjust for the distance between transmitter and receiver to keep the photodetector at the receiver within the proper dynamic range. Laser propagation is unequal: one transceiver may be receiving a strong signal from a remote transceiver, and yet the remote transceiver may not be receiving any signal at all.

FIG. 2 is a diagram showing variation in the plotted signal strength 108 of a transmitted laser beam. Due to atmospheric conditions or other causes, the signal strength may dip below a desired threshold value at a first time 110 and later rise above the desired threshold value at a subsequent time 112. Selection of a particular threshold value may be determined empirically, since the value generally will vary for any particular laser communication system.

In one embodiment of the invention, the signal strength data stream is monitored by each transceiver and used to predict when the signal strength being received by a remote receiving transceiver will fall below the selected threshold. This embodiment has the advantage that transmission can be suspended before data dropouts can occur, obviating the need to retransmit lost data.

In particular, each transceiver A, B preferably uses a simple linear prediction algorithm that forward projects the slope of the plotted signal strength data. Such forward projection can give a reasonably good estimate of a time point 110 when the signal strength will be inadequate for information packet transmission, and thus allow the sending transceiver to suspend transmission. When the signal strength again exceeds the desired threshold value at a subsequent time point 112, transmission resumes. The resumption point can be based upon actual measured signal strength, or upon a similar forward projection.

It has been found that the effects of scintillation essentially do not change more rapidly than about 1 KHz. Accordingly, in the preferred embodiment, each transceiver samples the received signal strength data stream transmitted by the remote transceiver at a sufficiently high rate to properly forward predict the signal strength. In the preferred embodiment, the signal strength data stream date rate and the receiver sampling frequency are about 10 KHz.

The linear prediction technique in its simplest form is based upon determining the slope a of the plotted signal strength 108 at two points, $x_{i-1}$, $y_{i-1}$ and $x_i$, $y_i$, where:

$$a = \frac{y_{i-1} - y_i}{x_{i-1} - x_i}$$

Then, using the formula y=ax+b, the control system can predict whether a next point $x_{i+1}$ in the series will have a $y_{i+1}$ coordinate at or below the threshold value. In practice, this prediction can be implemented as a linear predictive filter for speed, or as a neural network or similar heuristic predictive algorithm. Other forward prediction techniques may be used, but linear prediction will normally meet most needs. In any case, the algorithm is preferably implemented in software, but may be implemented in a dedicated circuit.

FIG. 3 is a flowchart showing one algorithm for implementing the invention. The signal strength data stream from the remote transceiver is monitored on a periodic but continuing basis by a first control loop algorithm. If the signal strength data stream is not detected at all (STEP 200), then the control circuit is commanded to suspend transmission of information packets (STEP 202). Otherwise, the signal strength is compared to a selected threshold value (STEP 204). If the signal strength is not above the threshold value, then the control circuit is commanded to suspend transmission of information packets (STEP 202). Otherwise, the predicted signal strength is compared to the selected threshold value (STEP 206) (this step is optional, as indicated by dashed lines in FIG. 3). If the predicted signal strength is not above the threshold value, then the control circuit is commanded to suspend transmission of information packets (STEP 202). Otherwise, the tests are repeated.

After any suspension of transmission of information packets, the signal strength data stream from the remote transceiver is monitored on a periodic but continuing basis by a second control loop algorithm. As noted previously, when transmission of information packets is suspended, the communicating transceivers still attempt to send and to monitor the signal strength data stream.

The second control loop may be similar to the first control loop, or may have slightly different tests. If the signal strength data stream is not detected (STEP 208), then the control loop continues to monitor for the presence of the signal strength data stream. Otherwise, If the signal strength data stream is detected (STEP 208), the signal strength is compared to a selected threshold value (STEP 212). If the signal strength is above the threshold value, then the control circuit is commanded to resume transmission of information packets (STEP 210). Otherwise, the predicted signal strength is compared to the selected threshold value (STEP 214) (this step is optional, as indicated by dashed lines in FIG. 3). If the predicted signal strength is above the threshold value, then the control circuit is commanded to resume transmission of information packets (STEP 210). Otherwise, the tests are repeated.

In any case, the tests of the control loops need not be conducted in the order shown in FIG. 3, and other or fewer tests may be performed. For example, a specific test for total loss of the signal strength data stream may not be necessary if the detection circuitry is configured to set the signal strength to zero in such an event.

Figure 4:
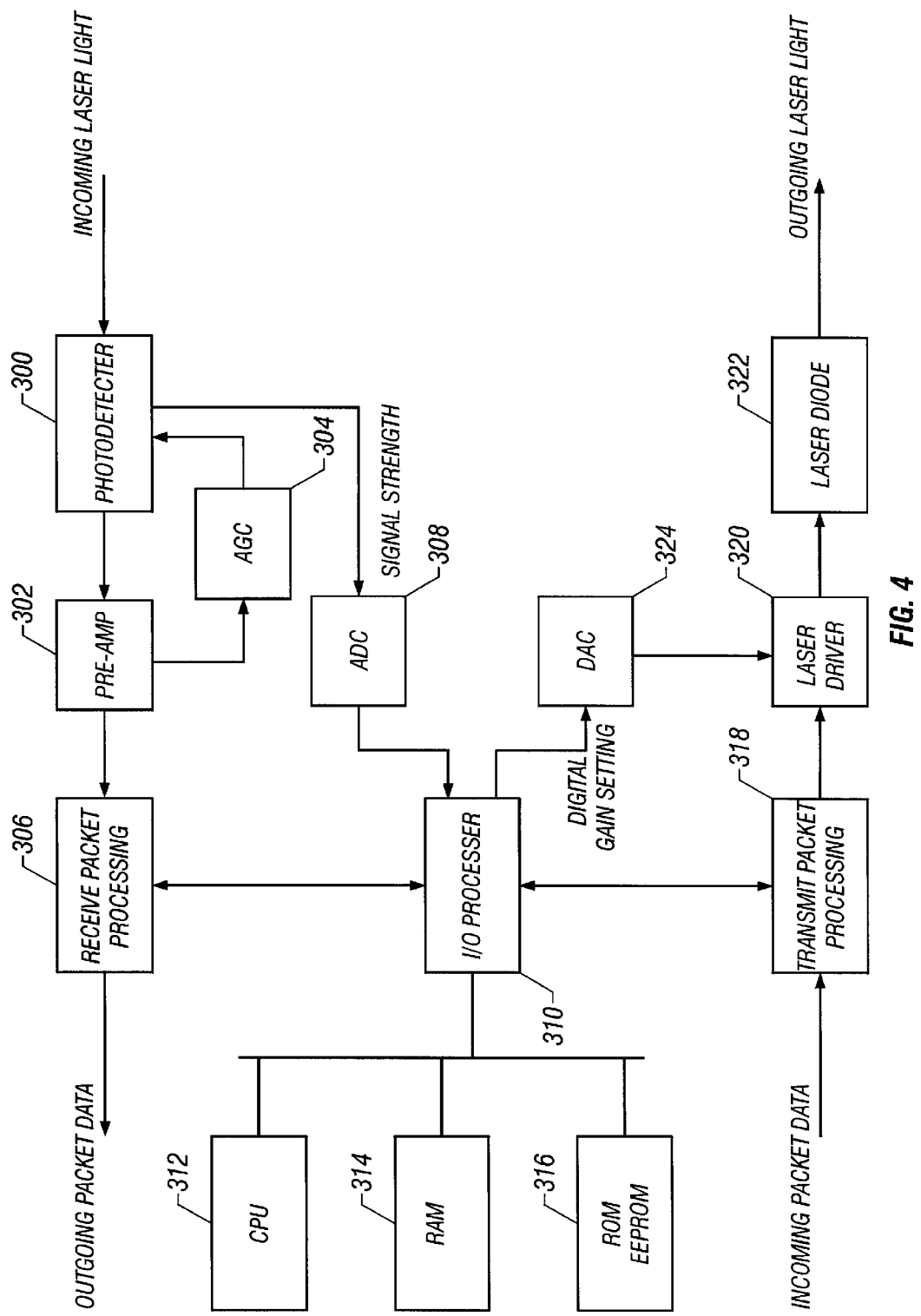
FIG. 4 is a block diagram of a preferred embodiment of the control circuit of the invention.

FIG. 4 is a block diagram of a preferred embodiment of the control circuit of a transceiver configured in accordance with the invention. Incoming laser light from a remote transceiver is detected by a photodetector 300, which is coupled in conventional fashion to a pre-amplifier 302 and automatic gain control (AGC) circuit 304. The output of the pre-amplifier 302 is coupled to a Receive Packet Processing circuit 306 which may include conventional decoding, formatting, and protocol conversion functions. The output of the Receive Packet Processing circuit 306 comprises outgoing packet data.

An analog output of the photodetector 300, representing the signal strength of the incoming laser light from the remote transceiver, is also coupled to an analog-to-digital converter (ADC) 308. The digital output of the ADC 308 is coupled to a programmable input/output (I/O) processor 310, which provides overall I/O control for the transceiver. The ADC 308 provides the processor 310 with a measure of the signal strength of the received signal, which is transmitted back to the remote transceiver in accordance with the invention.

The I/O processor 310 is coupled by means of a bus to a general central processing unit 312, read/write random access memory 314, and read only memory 316, which may include writeable forms of read only memory, such as EEPROM. The I/O processor 310 also is coupled to the Receive Packet Processing circuit 306. The Receive Packet Processing circuit 306 provides a decoded signal strength data stream from a remote transceiver to the I/O processor 310, for processing as described above with respect to FIG. 3.

The functions described with respect to FIG. 3 can be programmed into the I/O processor 310 in various ways, in known fashion. For example, program code implementing the control loop algorithms of FIG. 3 may be stored in the read only memory 316 and downloaded into the I/O processor 310 during system startup under the control of the CPU 312.

The I/O processor 310 is also coupled to a Transmit Packet Processing circuit 318, which receives incoming packet data and may perform conventional decoding, formatting, and protocol conversion functions. The output of the Transmit Packet Processing circuit 318 is coupled to a laser driver 320, which in turn is coupled to a laser diode 322. The output of the laser diode 322 is modulated laser light. Included in the outgoing beam is a signal strength data stream indicating the signal strength of the remote transceiver, as measured by the ADC 308.

The I/O processor 310 is also coupled to a digital to analog converter (DAC) 324. The input to the DAC 324 is a digital gain setting, which may be derived from the received signal strength data stream from a remote transceiver. The output of the DAC 324 is an analog gain control signal coupled to the laser driver 320, for providing feedback to the output laser diode 322 while the signal strength of the transceiver exceeds a selected threshold. Such a gain control allows the system to compensate for slow variations in signal strength due to fog, rain, etc., and allows the system to adjust for the distance between transmitter and receiver to keep the photodetector at the receiver within the proper dynamic range. The circuit thus can perform gain control on its own transmission signal level to compensate for slowly varying transmission amplitudes as determined by using feedback from the remote transceiver.

If the received indication of the transceiver's own signal strength does indicate that transmission must be suspended, the I/O processor 310 can suspend coupling of information packets from the Transmit Packet Processing circuit 318 to the laser driver 320.

In another aspect of the invention, if the control circuitry senses a long-term drop in signal strength which is not within the bandwidth domain of scintillation, then one of several corrective actions may be taken. For example, one possibility of long-term drop in signal strength is that one of the lasers is weakening. This can be determined by examining saved historical data for the link signal strength. In such a case, a network manager can be alerted to examine the system. Another possibility is that large atmospheric attenuation exists. This problem cannot be controlled but system controller can take action such as to route data communications through an alternate link, such as a point-to-point microwave link or through land lines. Another possibility is that the two transceivers have fallen out of alignment because of thermal drift, vibration, swaying of support structures, etc. Servomotors can be directed to perform beam steering to bring the two transceiver units into alignment by coordinating between the two heads.

The invention may be implemented in hardware or software, or a combination of both. For example, the receive and transmit data processing described above may be implemented in a programmable gate array or application specific integrated circuit. Alternatively, the invention may be implemented in computer programs executing on programmable computers each comprising a processor, a data storage system (including volatile and non-volatile memory and/or storage elements), at least one input device, and at least one output device. Program code is applied to input data to perform the functions described above and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. For example, besides indicating the power received from a remote transmitter, the signal strength data stream may also include control signals that indicate the power intended to be or actually transmitted by a transceiver, and the current control state of the transceiver. Accordingly, other embodiments are within the scope of the following claims.

What is claimed is:

1. A method for controlling a free-space atmospheric laser communication transceiver for reducing transmission error, comprising the steps of:
   (a) receiving in a receiving transceiver a signal strength data stream from a remote transceiver, the signal strength data indicating a signal strength measured by the remote transceiver for the receiving transceiver;
   (b) determining if the received signal strength data stream indicates that the signal strength of the receiving transceiver does not exceed a selected threshold value;
   (c) suspending transmission of information packets from the receiving transceiver to the remote transceiver if such determination indicates that the signal strength of the receiving transceiver does not exceed the selected threshold value.

2. The method of claim 1, further including the steps of:
   (a) determining if the signal strength data stream is not received by the receiving transceiver;
   (b) suspending transmission of information packets from the receiving transceiver to the remote transceiver if such determination indicates that the signal strength data stream is not received by the receiving transceiver.

3. The method of claim 1, further including the step of adjusting a gain value for a laser transmission of the receiving transceiver based upon the received signal strength data stream.

4. The method of claim 1, further including the step of continuously transmitting the signal strength data stream while transmission of information packets is suspended.

5. A method for controlling a free-space atmospheric laser communication transceiver for reducing transmission error, comprising the steps of:
   (a) receiving in a receiving transceiver a signal strength data stream from a remote transceiver, the signal strength data indicating a signal strength measured by the remote transceiver for the receiving transceiver;
   (b) determining is a predicted signal strength derived from the signal strength data stream does not exceed a selected threshold value;
   (c) suspending transmission of information packets from the receiving transceiver to the remote transceiver if such determination indicates that the predicted signal strength derived from the signal strength data stream does not exceed the selected threshold value.

6. The method of claim 5, wherein the step of determining if a predicted signal strength derived from the signal strength data stream does not exceed the selected threshold value includes the steps of:
   (a) computing a forward projection of signal strength based on at least two past data values derived from the signal strength data stream;
   (b) comparing the computed forward projection to the selected threshold value.

7. The method of claim 6, wherein the step of computing a forward projection of signal strength includes the step of computing a slope from the past data values.

8. The method of claim 5, further including the steps of:
   (a) determining if the signal strength data stream is not received by the receiving transceiver;
   (b) suspending transmission of information packets from the receiving transceiver to the remote transceiver if such determination indicates that the signal strength data stream is not received by the receiving transceiver.

9. The method of claim 5, further including the step of adjusting a gain value for a laser transmission of the receiving transceiver based upon the received signal strength data stream.

10. The method of claim 5, further including the step of continuously transmitting the signal strength data stream while transmission of information packets is suspended.

11. A method for minimizing the effects of atmospheric degradation of signal propagation in a free-space atmospheric laser communication system comprising a first and a second laser transceiver for reducing transmission error, comprising the steps of:
    (a) transmitting a signal strength data stream between each transceiver, the signal strength data from each transceiver indicating a signal strength measured for the other transceiver;
    (b) receiving the signal strength data stream in one of the first or second transceivers;
    (c) suspending transmission of information packets from the receiving transceiver to the other transceiver if:
       (1) the signal strength data stream is not received by the receiving transceiver; or
       (2) the received signal strength data stream indicates that the signal strength of the receiving transceiver does not exceed a selected threshold value.

12. The method of claim 11, further including the step of adjusting a gain value for a laser transmission of the receiving transceiver based upon the received signal strength data stream.

13. The method of claim 11, further including the step of continuously transmitting the signal strength data stream while transmission of information packets is suspended.

14. A method for minimizing the effects of atmospheric degradation of signal propagation in a free-space atmospheric laser communication system comprising a first and a second laser transceiver for reducing transmission errors during periods of dropouts or low signal level due to scintillation or other causes, comprising the steps of:
    (a) transmitting a signal strength data stream between each transceiver, the signal strength data from each transceiver indicating a signal strength measured for the other transceiver;
    (b) receiving the signal strength data stream in one of the first or second transceivers;
    (c) suspending transmission of information packets from the receiving transceiver to the other transceiver in order to prevent or minimize data dropouts and to attain very low bit error rates if:
       (1) the signal strength data stream is not received by the receiving transceiver; or
       (2) the received signal strength data stream indicates that a predicted signal strength of the receiving transceiver does not exceed a selected threshold value.

15. The method of claim 14, further including the step of adjusting a gain value for a laser transmission of the receiving transceiver based upon the signal strength data stream.

16. The method of claim 14, wherein the step of determining if a predicted signal strength does not exceed the selected threshold value includes the steps of:
    (a) computing a forward projection of signal strength based on at least two past data values derived from the received signal strength data stream;
    (b) comparing the computed forward projection to the selected threshold value.

17. The method of claim 16, wherein the step of computing a forward projection of signal strength includes the step of computing a slope from the past data values.

18. The method of claim 14, further including the step of continuously transmitting the signal strength data stream while transmission of information packets is suspended.

19. A system for controlling a free-space atmospheric laser communication transceiver, comprising:
 (a) a receiver for receiving an incoming laser signal;
 (b) a transmitter for transmitting an outgoing laser signal, the outgoing laser signal including an indication of a signal strength for the incoming laser signal;
 (c) a signal strength determination circuit, coupled to the receiver, for monitoring the incoming laser signal for a signal strength data stream indicating a signal strength for the transmitter as received by a remote transceiver, and for determining if the signal strength data stream indicates that the signal strength of the transmitter does not exceed a selected threshold value;
 (d) a data transmission control circuit, coupled to the signal strength determination circuit, for suspending transmission of information packets in the outgoing laser signal if such determination indicates that the signal strength of the transmitter does not exceed the selected threshold value.

20. The system of claim 19, wherein the signal strength determination circuit further determines if the signal strength data stream is not received by the receiver, and the data transmission control circuit suspends transmission of information packets in the outgoing laser signal if such determination indicates that the signal strength data stream is not received by the receiver.

21. The system of claim 19, further including a gain control circuit, coupled to the signal strength determination circuit and the transmitter, for adjusting a gain value for the transmitter based upon the signal strength data stream.

22. The system of claim 19, wherein the data transmission control circuit continuously transmits the signal strength data stream while transmission of information packets is suspended.

23. A system for controlling a free-space atmospheric laser communication transceiver, comprising:
 (a) a receiver for receiving an incoming laser signal;
 (b) a transmitter for transmitting an outgoing laser signal, the outgoing laser signal including an indication of a signal strength for the incoming laser signal;
 (c) a signal strength determination circuit, coupled to the receiver, for monitoring the incoming laser signal for a signal strength data stream indicating a signal strength for the transmitter as received by a remote transceiver, and for determining if the signal strength data stream indicates that a predicted signal strength of the transmitter does not exceed a selected threshold value;
 (d) a data transmission control circuit, coupled to the signal strength determination circuit, for suspending transmission of information packets in the outgoing laser signal if such determination indicates that the signal strength of the transmitter does not exceed the selected threshold value.

24. The system of claim 23, wherein the signal strength determination circuit further includes means for:
 (a) computing a forward projection of signal strength based on at least two past data values derived from the signal strength data stream;
 (b) comparing the computed forward projection to the selected threshold value.

25. The system of claim 24, wherein the signal strength determination circuit further includes means for computing a slope from the past data values.

26. The system of claim 23, wherein the signal strength determination circuit further determines if the signal strength data stream is not received by the receiver, and the data transmission control circuit suspends transmission of information packets in the outgoing laser signal if such determination indicates that the signal strength data stream is not received by the receiver.

27. The system of claim 23, further including a gain control circuit, coupled to the signal strength determination circuit and the transmitter, for adjusting a gain value for the transmitter based upon the signal strength data stream.

28. The system of claim 23, wherein the data transmission control circuit continuously transmits the signal strength data stream while transmission of information packets is suspended.

* * * * *